United States Patent [19]

Neville

[11] Patent Number: 4,640,486
[45] Date of Patent: Feb. 3, 1987

[54] SEAT SWIVEL APPARATUS

[75] Inventor: Donald G. Neville, Manhattan Beach, Calif.

[73] Assignee: International Glide Mfg. Corp., Glendale, Calif.

[21] Appl. No.: 744,934

[22] Filed: Jun. 14, 1985

[51] Int. Cl.$^4$ ............................................. F16M 13/00
[52] U.S. Cl. .................................... 248/425; 108/103; 384/615; 403/146; 403/162; 248/415
[58] Field of Search ............... 248/425, 424, 415, 131, 248/349; 297/349; 108/103; 403/146, 161, 162, 164; 384/516, 513, 615, 610; 267/161, 162

[56] References Cited

U.S. PATENT DOCUMENTS

| | | | |
|---|---|---|---|
| 1,507,586 | 9/1924 | Cooper | 384/513 |
| 1,623,845 | 4/1927 | Kogstrom | 384/513 X |
| 1,893,814 | 1/1933 | Widin | 267/161 |
| 3,637,185 | 1/1972 | Mikos et al. | 248/425 |
| 3,834,660 | 9/1974 | Leffler | 248/425 X |
| 4,076,346 | 2/1978 | McMahan | 248/425 X |
| 4,401,287 | 8/1983 | Moeser | 248/425 |
| 4,406,172 | 9/1983 | Huesgen et al. | 267/161 X |
| 4,487,551 | 12/1984 | Mizutani et al. | 267/161 X |

Primary Examiner—Ramon O. Ramirez
Attorney, Agent, or Firm—Romney Golant Martin Seldon & Ashen

[57] ABSTRACT

A seat swivel apparatus includes a first mounting plate rotatively mounted to a second mounting plate. Each of the first and second mounting plates has a circular recess formed therein to define a pair of bearing races which hold bearing means such as a plurality ball bearings. The first and second mounting plates are held together utilizing fastening means that include a Belleville spring to provide a continuous and substantially constant biasing force on the plates to maintain them in proper rolling contact with the ball bearings. Each of the races include two arcuate sidewall portions and a connecting portion between the sidewall portions, the connecting portions being substantially flat to help prevent the bearings from tightening within the races.

16 Claims, 3 Drawing Figures

U.S. Patent
Feb. 3, 1987
4,640,486
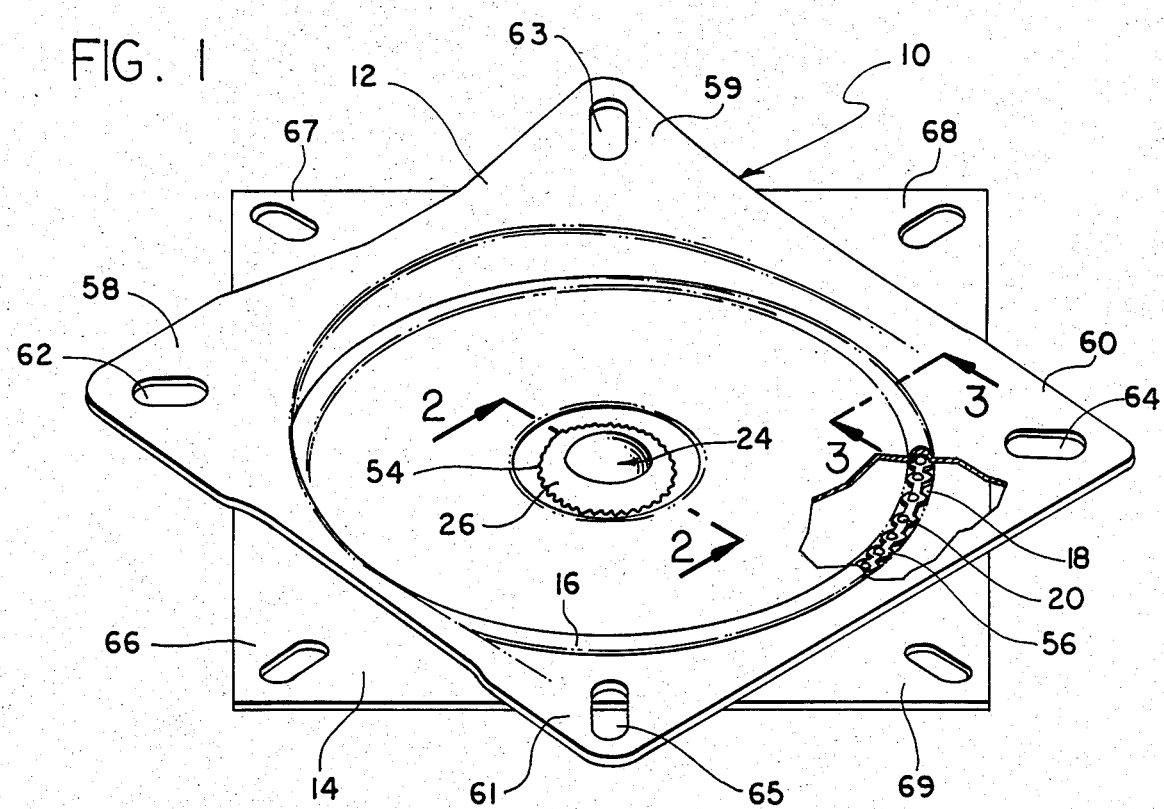
FIG. 1
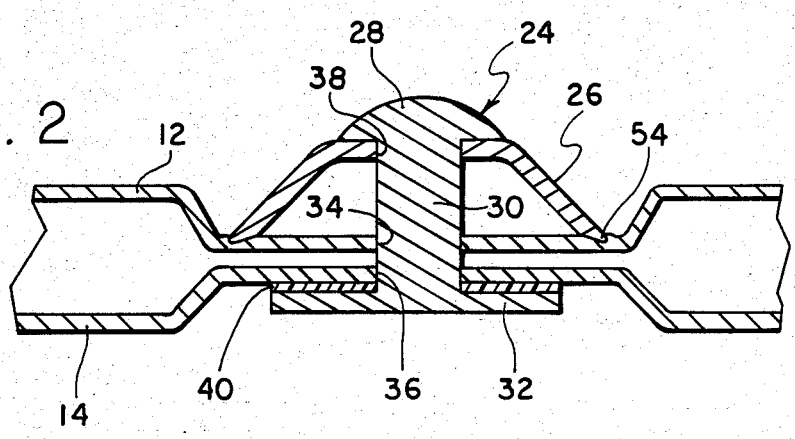
FIG. 2
FIG. 3

SEAT SWIVEL APPARATUS

BACKGROUND OF THE INVENTION

1. Field of the Invention

This invention relates generally to swivel devices used for rotating one object relative to another—such as a seat portion of a chair and a set of chair legs—and more particularly to a seat swivel that includes both a spring biasing member for maintaining a continuous and substantially constant force on the mounting plates of the swivel and a pair of bearing races having partial, flattened surfaces.

2. Prior Art

Conventional seat swivel devices usually include a top and bottom mounting plate, each having an annular channel which defines a race for holding a set of ball bearings. Generally, these swivel devices include fastening assemblies, such as a nut and bolt, which are fastened through pivot bores in each of the plates to maintain the plates in contact with the ball bearings. The plates can then rotate freely relative to one another via the ball bearings.

Typically, when a conventional swivel device is assembled, the nut must be fixed to the bolt to prevent the nut from loosening from the bolt during usage. This is usually done in a staking operation in which the nut is initially tightened to a location on the bolt which will maintain the plates in proper contact with the ball bearings. Thereafter, the end of the bolt is struck with a die forming a widened portion on the bolt that prevents the nut from loosening from the bolt. After this staking operation is performed, the nut is generally incapable of moving from its original, fixed position.

One major drawback in prior art devices that use this staking operation or any other operation to fix the nut to the bolt occurs when the swivel device becomes worn from usage. Even under normal conditions, the ball bearings, and particularly the bearing races, are subject to extreme frictional forces that results in some loss of metal from the inner surfaces of the races and from the ball bearings. The resulting wear to these surfaces causes the top and bottom plates to move closer to each other, however, the nut remains in the same fixed position on the bolt as originally set. Since the nut and bolt fastener fails to compensate for this wear, the top and bottom plates become loose since the fastener no longer provides the proper biasing force needed to maintain the plates in proper contact with the ball bearings.

This can result in a number of problems to the seat swivel device. For instance, the loosened plates may undergo a wobbling action, rather than smooth rotation. This wobbling action can be further heightened if the loosened bolt sits improperly within the bores, where excessive frictional forces between the bolt and plates can result in the wearing away of the bolt or the enlargement of the diameter of the bores. Also, the wobbling rotation caused by the loosened plates may allow the ball bearings to escape from within the bearing races.

Another disadvantage in using the prior art nut and bolt assembly occurs if the nut is not properly staked to the bolt. This usually occurs when the end portion of the bolt is not properly widened to prevent the nut from loosening on the bolt during use. If this should occur, it is possible for the nut to "retread" itself over the partially widened portion of the bolt, resulting in a lessening of the force holding the two plates together. The loosening of the nut in this manner will also cause the plates to loosen, again causing a wobbling action when the two plates undergo relative rotation. This wobbling action will increase even further as the races and ball bearings become worn during usage. Additionally, if a user leans back on a chair having a swivel with loosened plates, the plates may separate a sufficient amount to enable the ball bearings to escape from within the bearing races.

Although it is possible to retighten the nut when it loosens on these prior art devices, usually the nut and bolt are not accessible to a wrench or pliers unless the objects mounted to the plates are removed. This can be a painstaking operation to the owner since the plates must be removed and properly remounted to the object after the nut is tightened. In the case of a chair swivel, removing and replacing the mounting plates can be a clumsy and onerous job. Also, the nut might have to be restaked to the bolt in some cases, a process that requires skills and tools which are not generally possessed by most people. Further, since the wear to the races on the plates is gradual and continuous, this procedure of retightening the nut and bolt may be required at regular intervals.

Another problem associated with prior art chair swivels occurs during the manufacturing of the top and bottom mounting plates. Usually, the two plates are formed by a cold working operation in which a sheet of metal is stamped pressed in a die to create the desired shape. However, a great deal of precision is usually required during this operation to form the annular recess on each plate that defines bearing the race. Since most conventional swivel devices are formed with concave cross-sectional recesses, a great deal of precision is usually needed in matching the plates to produce upper and lower races that permit smooth rotation of the bearings. A race having minor eccentricities can cause the bearings to tighten, resulting in restricted rotation between the plates. Additionally, major eccentricities between the races could even cause the ball bearings to jam completely causing the plates to stop free rotation altogether. This problem usually occurs when the surfaces of the races do not align properly to permit each ball bearing to rotate freely. When this occurs, either or both of the mounting plates may become useless or have to be replaced with a matching plate to assure proper rotation of the bearings between the plates.

While prior art seat swivel devices are generally useful, these devices have limitations and disadvantages as illustrated above which are serious drawbacks. The present invention has as its objective the elimination of these and other disadvantages by providing a seat swivel apparatus that includes a fastener that utilizes a biasing means, such as a Belleville spring, to provide a continuous and substantially constant biasing force upon the plates to maintain them in proper rolling engagement with the ball bearings. The present invention also eliminates the two piece nut and bolt assembly by utilizing a unitary fastener known in the art as a kingpin that is cold headed over the Belleville spring to virtually eliminate the possibility that the fastener would become separated during use.

Another objective of the present invention is to provide bearing races that generally eliminate the need for extreme precision in forming and aligning the races on the mounting plates. The present invention accomplishes this by utilizing bearing races having partially flattened surfaces that allow for greater eccentricity when aligning the races on each mounting plates. Also, another aspect of the present invention is to provide bearing races that allow the ball bearings to be self-aligning and permits them to find their own center. Additionally, the races used in accordance with the present invention allow the chair swivel apparatus to be manufactured more easily and at reduced expense.

SUMMARY OF THE INVENTION

The present invention includes a first mounting plate and a second mounting plate, each plate having a matching circular recess which defines a top and bottom bearing race for holding a bearing means.

The bearing means used in the preferred embodiment are a plurality of ball bearings that roll between the races to permit the first and second mounting plate to rotate freely relative to each other. A fastening means for rotatably fastening the mounting plates together is also included. The invention utilizes a fastening means that includes an advantageous biasing element that maintains a continuous and substantially constant biasing force on the first and second mounting plates to maintain them in proper rolling contact with the ball bearings.

The biasing means used in accordance with the preferred embodiment of the present invention is a Belleville spring that maintains the proper biasing force needed to maintain the first and second mounting plates in proper contact with the ball bearings. The Belleville spring provides an advantageous feature since it can produce a continuous force to hold the plates together while maintaining substantially constant pressure. The Belleville spring has the additional advantage of providing a biasing means with a low profile. The low profile of the Belleville spring eliminates the need for attaching much larger and less desireable biasing means to the plates. Also, the Belleville spring is preferred since a properly sized spring can produce a biasing force that is substantially constant over a considerable deflection range. Thus, a properly sized Belleville spring can produce a substantially constant biasing force regardless of the amount of deflection caused by the wearing of the metal on the surfaces of the bearing races and the bearings.

Additionally, the present invention utilizes an advantageous fastener known in the art as a kingpin that eliminates the need for a two piece fastening assembly such as a nut and bolt. The use of the kingpin in connection with the Belleville spring virtually eliminates the possibility that the fastener will become loosened during operation. Thus, the present invention can be used without fear that the two mounting plates would become separated during use. Also, the Belleville spring and kingpin assembly are self-adjusting for changes in the space between the first and second plates caused by wear to metal on the inner surfaces of the bearing races or to the ball bearings.

The present invention also includes advantageous ball bearing races that can be used either separately or in connection with the Belleville spring. In the preferred embodiment, the first mounting plate is formed with a circular recess (top race) that includes two arcuate sidewall portions connected by a generally flat connecting portion. The second mounting plate is also formed with a circular recess (bottom race) which also includes two arcuate sidewall portions connected by a generally flat connecting portion. The flat connecting portions of the two recesses need not be aligned exactly with one another, but rather, can be slightly misaligned and still permit the bearings to roll freely without creating extreme running friction between the moving parts. This provides a distinct advantage both during the manufacturing and assembling of the seat swivel apparatus.

The flattened surfaces of the race negates any minor eccentricity that may be formed during manufacture. The advantageous races also allow the ball bearings to be self-aligning and allow them to find their own center. This prevents the bearings from tightening or climbing (as it is also known in the art) at different locations about the circular race, thus providing smoother rotation to the seat swivel assembly. Tightening, or climbing, generally occurs when the ball bearings are jammed or forced up against each other to restrict their rotation between the races. Also, the improved races, in accordance with the present invention, do not greatly increase the running friction between surfaces of the plates and the bearings to provide a swivel unit that has a satisfactory running life.

The result of using biasing means such as a Belleville spring along with a one piece fastener such as a kingpin produces a seat swivel apparatus that is particularly strong and durable. Additionally, the use of partially flattened races on the plates eliminates the need for extreme precision during the manufacture and assembling of the present invention. Thus, the present invention provides an advantageous seat swivel that is relatively simple to construct, much more reliable than conventional seat swivels, and is relatively inexpensive to manufacture.

BRIEF DESCRIPTION OF THE DRAWINGS

A complete understanding of the present invention and other advantages and features thereof may be gained from a consideration of the following description of the preferred embodiments taken in conjunction with the accompanying drawings in which:

FIG. 1 is a perspective view of a preferred embodiment of the present invention with a partial fragmentary view showing the bearing means located within the races.

FIG. 2 is an enlarged, partial cross-sectional view of the embodiment shown in FIG. 1 taken along line 2—2.

FIG. 3 is an enlarged, partial cross-sectional view of the embodiment shown in FIG. 1 taken along line 3—3.

DETAILED DESCRIPTION OF THE PREFERRED EMBODIMENTS

While the present invention is susceptible of various modifications and alternative constructions, the embodiment shown in the drawing will herein be described in detail. It should be understood, however, that it is not the intention to limit the invention to the particular form disclosed; but, on the contrary, the intention is to cover all modifications, equivalences and alternative constructions falling within the spirit and scope of the invention as expressed in the appended claims.

Referring initially to FIG. 1, a seat swivel apparatus 10 in accordance with the present invention includes a first mounting plate 12 and a second mounting plate 14. A circular recess which defines a top bearing race 16 is formed on the first mounting plate 12 and likewise, a circular recess defining a bottom race 18 is formed on the second mounting plate 14. The top race 16 and bottom race 18 are aligned with each other to define a bearing housing which holds the bearing means 20. The bearing means 20 transmits the load between the first plate 12 and second plate 14 and allows for low friction rotation of the plates relative to one another.

The seat swivel apparatus 10 also includes fastening means such as a solid rivet, or kingpin 24, and a biasing means such as a Belleville spring 26 to maintain the first mounting plate 12 and second mounting plate 14 in proper rolling contact against the bearing means 20.

Referring now to FIG. 2, the advantageous fastener used in connection with the Belleville spring 26 that maintains the continuous and substantially constant biasing force on the plates is shown as a kingpin 24 having a top head 28, a shaft 30 and a bottom head 32. The kingpin 24 holds the Belleville spring 26 against the first mounting plate 12 to maintain the proper biasing force needed to keep the plates in proper rolling contact with the bearing means 20 (FIG. 1). The first mounting plate 12 is formed with a bore 34 which receives the shaft 30 of the kingpin 24. Similarly, the second mounting plate 14 also has a bore 36 that is aligned with the bore 34 and also receives the shaft 30 of the kingpin. The bores 34 and 36 are located in the center of each respective mounting plate to permit the plates to rotate about the pivot axis created by the shaft 30. The Belleville spring also includes a bore 38 that receives the shaft 30 of the the kingpin. A thrust washer 40 may be placed between the bottom head 32 and the second mounting plate. The thrust washer 40 may be made from a nylon or another engineering material that reduces friction, wear, and heating of the bottom head 32 as it moves relative to the second plate 14.

Referring now to FIG. 3, the advantageous top and bottom races 16 and 18 that allow for minor eccentricities and slight misalignment of the plates are shown in greater detail. Again, this embodiment of the invention can either be used separately, or in conjunction with the Belleville spring.

The top race 16 has an inner surface 41 that includes two top arcuate sidewall portions 42 and 44 and a top connecting portion 46 between the two sidewall portions. As can be seen in FIG. 3, the top connecting portion 46 is substantially flat as compared to the two top sidewall portions 42 and 44 which are curved.

The bottom race also has an inner surface 47 that includes two bottom arcuate sidewall portion 48 and 50 and a bottom connecting portion 52 between the two sidewall portions. The bottom connecting portion 52, like the top connecting portion 46, is formed to provide a substantially flat surface. Again, the bottom sidewall portions 48 and 50 are curved to conform to the bearing means, such as the ball bearing 53 shown in FIG. 3. In a preferred embodiment, both the top and bottom flat connecting portions have a width of about 10 mils.

Referring again to FIG. 3, the top race is shown slightly misaligned above the bottom race so that the top connecting portion 46 is not exactly aligned above the bottom connecting portion 52. While the drawing is exaggerated to properly illustrate the type of misalignment that can occur, it does show the feature of the top and bottom connecting portion 46 and 52 which makes the present invention advantageous.

The placement of the top and bottom races in FIG. 3 is typical of the misalignment that can be caused by eccentricities formed in the plates during the manufacture or the assembly of the swivel device. Normally, if this type of misalignment occurred to a prior art swivel device, the races would form a smaller passage that would prevent the ball bearings from properly rolling there through. This type of misalignment would at least cause the ball bearings to tighten or jam within the races. In turn this would cause at least some restriction to the smooth rotation between the bearings and the races which would result in restricted rotation between the top and bottom plates.

The top and bottom flat connecting portions 46 and 52 made in accordance with the present invention, however, provide additional space for misalignment and would not necessarily restrict the rotation of the ball bearings at a location where the top and bottom recesses are not perfectly aligned. Since the ball bearings are only in what might be considered point contact with the flattened connecting portions, the widened portions on each race provide more space for the ball bearings to move and avoid such misalignments. This results in an advantageous swivel that provides freer rotation by preventing tightening of the ball bearings within the races. Additionally, the present embodiment permits the ball bearings to find their own centers and be self aligning.

In most applications, the bottom mounting plate 14 is placed on an object, such as a set of chair legs or a stool stem, which remains stationary and acts as a support structure. The top mounting plate 12 can then be mounted to an object, such as the seating surface or seat portion of the chair or the stool, which may rotate about the stationary object. In the preferred embodiment of the invention, the top head 28 of the kingpin causes the Belleville spring to be embedded slightly into the first mounting plate to prevent the spring from moving relative to the first plate. This can be facilitated by providing the Belleville spring with a serrated outer edge 54 (as shown in FIG. 1) which "digs" into the upper surface of the top plate when the head 28 is pressed downwardly to produce a force on the spring 26. This biases the spring to act on the plates with a generally constant force causing the plates to be thrusted toward each other. Thereafter, when the rotated object is moved relative to the stationary object, the kingpin and spring remain stationary relative to the first plate but rotate in relation to the second plate. As mentioned previously, the thrust washer 40 (FIG. 2) prevents excessive wear from occurring between the second plate and the bottom head 32 of the kingpin.

Even under normal conditions, the inner surfaces 41 and 47 of the top and bottom races 16 and 18 undergo substantial frictional forces as they contact the ball bearings 53 resulting in some loss to the metal on these inner surfaces. Also, the surfaces of the ball bearings become worn from use resulting in a decrease of their diameters. When this occurs, the first and second plates 12 and 14 move closer to each other, however, the Belleville spring forces the plates closer to each other thereby automatically compensating for the wear. This maintains the plates in proper contact with the bearings and prevents the plates from becoming loosened.

As the first and second mounting plates move closer to each other due to wear, the Belleville spring deflects to compensate for this change to maintain a substantially constant force on the two plates. Even though the wear to the races is a slow progressive process, the Belleville spring nevertheless continually defects to compensate for the wear. Also, by choosing a Belleville spring which produces a substantially constant force over a substantially wide range of deflection, it is possible to maintain the same force on the mounting plates as the Belleville spring deflects to compensate for the wear. This is an important feature since too little or too large of a biasing force on the plates can cause problems effecting the rotation of the ball bearings between the plates.

In some applications, it may be economical to use a spacer 56 (FIGS. 1 and 3) which holds each ball bearing 53 at a spaced distance from the other to reduce the number of ball bearings placed between the races. Also, the spacer 56 separates the bearings so that rubbing contact between them does not occur. This increases the life of the bearings.

In the preferred embodiments, the kingpin is formed by using an appropriate size wire stock that can be cold worked in a stamping operation well known in the art to form the bottom head 32. A prescribed amount of wire stock forming the shaft 30 must then be available through the bores 34 and 36 of the first and second mounting plates. The Belleville spring can then be placed on the shaft. Thereafter, the top head 28 can be formed from the stock using orbital spinning or orbital riveting techniques, two operations well known in the art. The head 28 is formed using either of these preferred methods to provide a greater amount of overhang to the head 28 to help prevent the kingpin and Belleville spring from rotating relative to the first plate. The bore 34 of the first plate can also be made slightly smaller than the diameter of the shaft 30 to form a press fit that also helps prevent the kingpin from rotating relative to the first plate.

The first mounting plate can further include several seat mounting flanges 58, 59, 60 and 61 (FIG. 1) having corner slots 62, 63, 64 and 65. The seat mounting flanges and corner slots permit the rotatable object to be easily mounted to the first mounting plate. The second mounting plate 14 can also include base mounting flanges 66, 67, 68 and 69 which can include similar corner slots or threaded holes for mounting the second plate onto the stationary base. Further, one pair of flanges 58 and 59 can be formed at a different height from another pair of flanges 60 and 61 to create a slight incline or pitch to a seat mounted to the first mounting plate.

The first and second mounting plates can be formed from a steel that is shaped by a cold forming operation using conventional presses and dies. For example, the plate may be formed using a set of progressive dies. In one operation, the corner slots, bores, and recesses can be initially formed into the plate using a single die and thereafter a second operation can form the desired shapes of the mounting flanges. The ball bearings, spacer, Belleville spring and kingpin used in the preferred embodiments are all standard elements well known in the art.

The design of a properly sized seat swivel requires the designer/engineer to select the correct guage of steel plate and size of ball bearings to properly carry the maximum load to be placed on the swivel for any given application. Generally, an 8 to 12 guage steel plate is appropriate for most chair seat applications.

The design of the size of the races formed on the plates is generally dependent upon the size of the ball bearings selected to bear the load. Usually, the top and bottom races are formed to a size that maintains the ball bearings in point contact with both the top and bottom connecting portions. The width of the connecting portions is dependent upon the size of the ball bearings and should be at least about two to five times wider than the width of the contact point between the ball bearings and the flat surfaces. These connecting portions may be further widened to allow for greater tolerance when aligning the top and bottom races.

In assembling the first and second mounting plates, it is still important to align the top and bottom circular races as close as possible to form a smooth bearing housing for the ball bearings. The present invention is advantageous over conventional prior art swivel devices since less precision is needed to assemble an operable set of bearing races. This is attributable to the flattened surfaces of the top and bottom connecting portions 46 and 52 which provide a greater amount of room for the bearings to roll in. Thus, the present invention provides a swivel device which requires less precision to make and assemble than prior art swivel devices.

In using the present invention, the second mounting plate is usually attached to the stationary base by simply inserting fastening devices through the corner slots of the base mounting flanges. The desired seat can then be attached to the first mounting plate by placing fateners through the corner slots located in the seat mounting flanges. Of course, it will be appreciated that the size and material strength of the two mounting plates must be adjusted accordingly, along with the size of the ball bearings, in order to properly bear the loads which will be placed on the chair swivel apparatus.

Thus, there has been illustrated and described a unique and novel swivel which fulfills all of the objects and advantages set forth. It should be understood that many changes, modifications, variations and other uses and applications will become apparent to those skilled in the art after considering this disclosure and the accompanying drawings. Therefore, any and all such changes, modifications, variations, and other uses and applications which do not depart from the spirit and scope of the invention are deemed to be covered by the invention which is limited only by the following claims.

What is claimed is:

1. A seat swivel apparatus comprising:
    a first mounting plate having circular recess formed therein adapted to connect to a seating surface, said first mounting plate having a bore defined therein;
    a second mounting plate having a circular recess formed therein adapted to connect to a support structure, said second mounting plate having a bore defined therein;
    bearing means located within said recesses for transmitting loads between said first and second mounting plates and for allowing relative rotation between said plates; and
    means for rotatably fastening said plates, said fastening means being insertable into each of said bores on said first and second mounting plates,
    said fastening means having a Belleville spring attached thereto for biasing said mounting plates together, said Belleville spring maintaining a continuous and generally constant force to urge said mounting plates together.

2. The seat swivel apparatus as defined in claim 1 wherein said Belleville spring has an outer serrated edge.

3. The seat swivel apparatus of claim 1:
    wherein each of said recesses have two arcuate sidewall portions and a connecting portion between said sidewall portions, said connecting portion being generally flat.

4. The seat swivel apparatus of claim 2:
    wherein each of said recesses has two arcuate sidewall portions and a connecting portion between said sidewall portions, said connecting portion being generally flat.

5. The seat swivel apparatus of claim 2 wherein said bearing means comprises a plurality of ball bearings.

6. The seat swivel apparatus as defined in claim 5: wherein said fastening means comprises a shaft inserted into each of the bores of said mounting plates to form a pivot for rotational movement.

7. The seat swivel apparatus as defined in claim 1 wherein said bearing means comprises a plurality of ball bearings.

8. The seat swivel apparatus as defined in claim 1: wherein said fastening means comprises a shaft inserted into each of the bores on said mounting plates, wherein said shaft further retains said Belleville spring against said first mounting plate.

9. The seat swivel apparatus as defined in claim 3 wherein each of said connecting portions is about 10 mils in width.

10. A seat swivel as defined in claim 9 wherein said fastening means comprises a shaft with formed ends.

11. The seat swivel apparatus as defined in claim 4 wherein each of said connecting portions is about 10 mils in width.

12. A seat swivel apparatus comprising:
a first mounting plate having a circular recess formed therein adapted to connect to a seating surface;
a second mounting plate having a circular recess formed therein adapted to connect to a support structure, wherein each of said recesses have two arcuate sidewall portions and a connnecting portion between said sidewall portions, said connecting portion being generally flat;
bearing means located within said recesses for transmitting loads between said first and second mounting plates and for allowing relative rotation between said plates;
a Belleville spring for biasing said mounting plates together; and
means for rotatably fastening said plates, said fastening means further retaining said Belleville spring against either of said plates.

13. The seat swivel apparatus as defined in claim 12: wherein each of said mounting plate has a bore defined therein;
said fastening means comprises a shaft inserted within each of said bores of said plates, said shaft further retaining said Belleville spring against either of said plates.

14. The seat apparatus as defined in claim 13 wherein said Belleville spring has a serrated outer edge.

15. The seat swivel apparatus as defined in claim 14 wherein each of said connecting portions is about 10 mils in width.

16. The seat swivel apparatus as defined in claim 12 wherein said bearing means comprises a plurality of ball bearings in point contact with each of said connecting portions, each of said connecting portions having a width from about 2 to 5 times the width of the contact point between one of said ball bearings and said connecting portion.

* * * * *